(No Model.)

M. J. WIGHTMAN.
ELECTRICAL SYSTEM OF MOTOR REGULATION.

No. 546,966. Patented Sept. 24, 1895.

WITNESSES:
Fred. A. Phelps Jr
W. Milt. Brown.

INVENTOR
Merle J. Wightman
BY
Ward Raymond
ATTORNEY.

UNITED STATES PATENT OFFICE.

MERLE J. WIGHTMAN, OF JOHNSTOWN, PENNSYLVANIA.

ELECTRICAL SYSTEM OF MOTOR REGULATION.

SPECIFICATION forming part of Letters Patent No. 546,966, dated September 24, 1895.

Application filed March 27, 1895. Serial No. 543,387. (No model.)

*To all whom it may concern:*

Be it known that I, MERLE J. WIGHTMAN, of Johnstown, county of Cambria, State of Pennsylvania, have invented a new and useful Improvement in Electrical Systems, of which the following specification is a true and exact description, due reference being had to the accompanying drawings.

My invention relates to certain improvements in those electrical systems in which a secondary electrical machine is interposed between the main generator and the translating device for the purpose of controlling the current supplied to the translating device by means of a counter electromotive force generated in the secondary machine.

The object of my invention is to combine in one single machine the counter-electromotive-force regulator, which has heretofore been practically two independent machines, though perhaps connected together.

I will now describe my invention with the aid of the drawings, in which—

Figure 1:
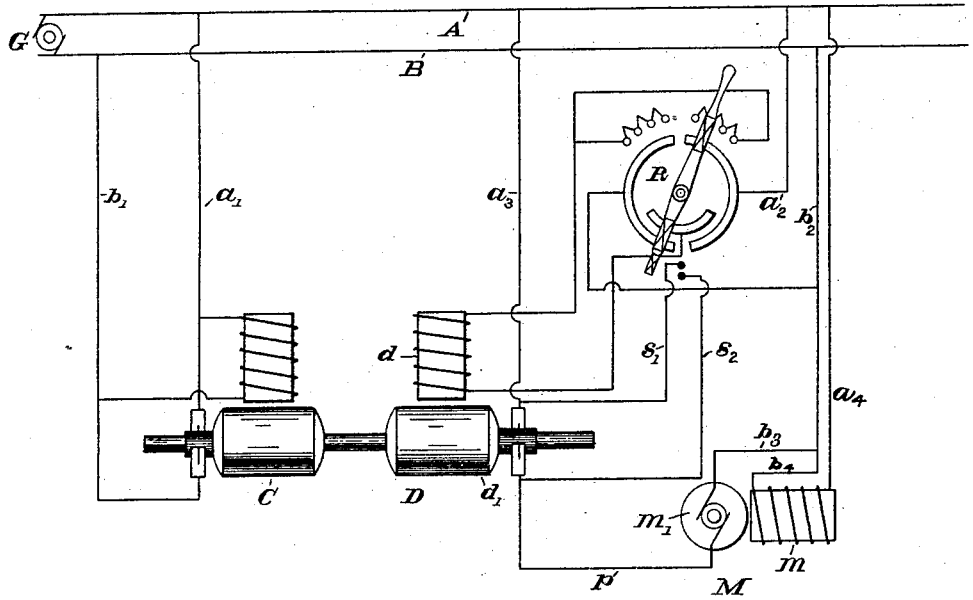
Figure 2:
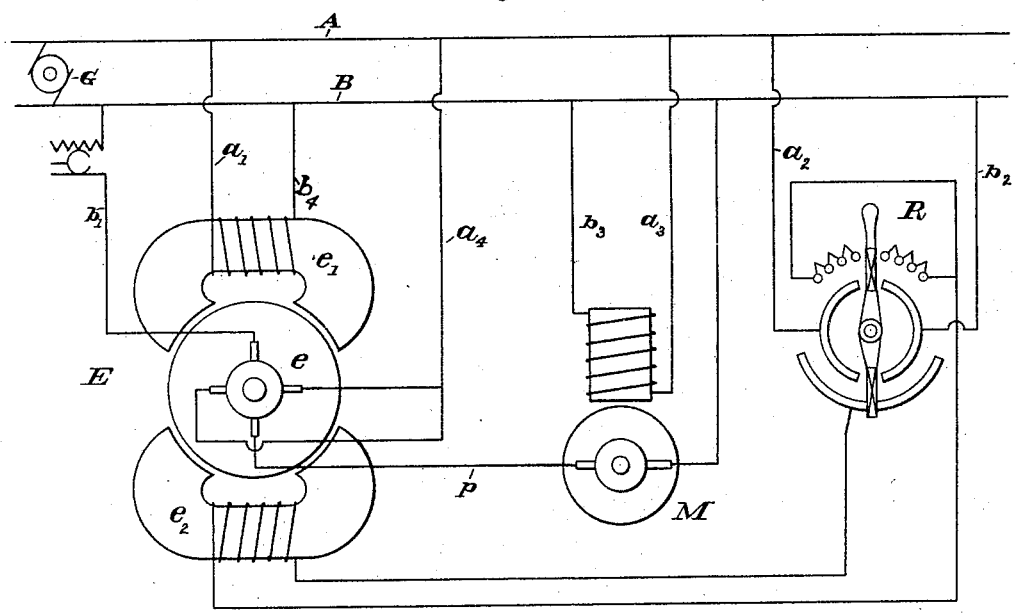

Figure 1 represents an electrical system having the form of regulator heretofore known, and which I show and describe for the purpose of better explaining my invention. Fig. 2 shows an electrical system having one of my improved regulators, as will be hereinafter described.

In Fig. 1, G is a constant-potential generator supplying the main conductors A and B. M is any translating device, as a motor having the field $m$ and the armature $m'$. The field $m$ is constantly energized by current from conductors A and B by means of shunt $a^4 b^4$. The armature $m'$ is also in shunt with the conductors A B, but in series with it is the armature $d'$ of electric machine D. The field $d$ of this is controlled by means of the controller R. C is a motor connected with armature $d'$ and adapted to operate it. It will now be seen that any current flowing through motor-armature $m'$ must pass through armature $d'$, which is revolved at a constant speed by motor C, and that by energizing field $d$ more or less and with the proper polarity an electromotive force will be set up in armature $d'$ which will oppose or assist the main current flowing through it.

Fig. 1, as I have said above, is the general construction employed.

Referring now to Fig. 2, I will describe a machine embodying my invention. G is the main generator and A and B the line-conductors. M is the motor or translating device to be operated. E, the regulator, is an electrical machine having the simple armature $e$ and the fields $e'$ and $e^2$.

By the term "simple" armature I mean an armature of the usual Siemens or Grammering type, and having but one set of windings thereupon. This armature is in shunt with the main conductors through connections $a^4 b'$, and in series with motor M through conductor P. Of the two fields $e'$ is directly in shunt with the conductors A and B through connections $a' b^4$. The other field $e^2$ is also in shunt with A B through $a^2 b^2$, separate from that of field $e'$. In the shunt $a^2 b^2$ is the controlling-resistance R, by means of which the strength of field $e^2$ may be controlled and its polarity reversed. It will be seen that part of the winding of armature $e$, which is in the shunt $a^4 b'$, is influenced by the field $e'$, while that portion of the armature that is in shunt $a^4 p$ is influenced by field $e^2$. Now if the field $e'$ be energized and current passed through the shunt $a^4 b'$, the armature will revolve, and if the field $e^2$ be not energized the motor M will receive practically the full potential between conductors A and B. If, however, a current be passed through shunt $a^2 b^2$ and field $e^2$ energized, an electromotive force will be generated in armature $e$, which will either assist or oppose the current passing through it in the same manner as described in Fig. 1. By this means I am enabled to combine the two machines shown in Fig. 1 into one in a very advantageous manner.

I have not claimed in this case, nor do I intend to claim, broadly, the combination with an electric motor of a counter-electromotive-force regulator consisting of a second dynamo-electric machine whose armature is in series with the motor to be regulated, and independent means for varying the counter electromotive force of the said second dynamo-electric machine, nor the combination with an electric motor of a counter-electromotive-force regulator consisting of a dynamometer whose motor-armature is in shunt to the line and whose generator-armature is in shunt to the line and in series with the motor to be regulated, and I specifically disclaim such subject-matter, broadly considered.

Having thus described my invention, what I claim, and desire to protect by Letters Patent, is—

1. In combination with a source of constant potential and a translating device, a counter electro-motive force regulator consisting of a dynamo, having a single simple armature, one portion of which amature is in shunt to the source of constant potential and another portion of which is in shunt to the source of constant potential and in series with the translating device.

2. In combination with a source of constant potential and a translating device, a counter electro-motive force regulator consisting of a single simple armature one portion of which is in shunt to the source of constant potential and another portion of which is in shunt to the source of constant potential and in series with the translating device, a substantially constant field adapted to influence one portion of said armature, and a variable field adapted to influence another portion of said armature, and means adapted to regulate said variable field.

3. In combination with a main electrical generator having conductors leading therefrom and a translating device, a secondary simple armature, a substantially constant magnetic field embracing one portion of the armature, a variable and controllable magnetic field embracing another portion to the armature, connections between said armature and said conductors, whereby that portion of the armature affected by the constant field operates as a motor, and connections between said armature and the translating device, the current passing to said translating device being controlled by varying the aforesaid magnetic field.

4. In combination with a main electrical generator having conductors leading therefrom and a translating device, a secondary electrical machine having a simple armature operating in a plurality of separate magnetic fields, said armature being in electrical connection with the main conductors and also in connection with the translating circuit and means for controlling a portion of the magnetic fields in which the secondary armature operates.

In testimony whereof I have set my hand in the presence of two witnesses.

MERLE J. WIGHTMAN.

Witnesses:
GRACE M. DOUD,
EUGEN T. WIGHTMAN.

Correction in Letters Patent No. 546,966.

It is hereby certified that in Letters Patent No. 546,966, granted September 24, 1895, upon the application of Merle J. Wightman, of Johnstown, Pennsylvania, for an improvement in "Electrical Systems of Motor Regulation," an error appears in the printed specification requiring correction, viz: In line 101, page 1, the word "dynamometer" should read *dynamoter;* and that the said Letters Patent should be read with this correction therein that the same may conform to the record of the case in the Patent Office.

Signed, countersigned, and sealed this 22d day of October, A. D. 1895.

[SEAL.]

JNO. M. REYNOLDS,
*Assistant Secretary of the Interior.*

Countersigned:
S. T. FISHER,
*Acting Commissioner of Patents.*